United States Patent
Bohm et al.

(10) Patent No.: US 6,653,936 B2
(45) Date of Patent: *Nov. 25, 2003

(54) PATCH AND TIRE MONITORING DEVICE

(75) Inventors: Georg G. A. Bohm, Akron, OH (US); John D. Rensel, Tallmadge, OH (US); Russell W. Koch, Hartville, OH (US); John L. Turner, Akron, OH (US); Robert J. Trew, Blacksburg, VA (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/101,306

(22) Filed: Mar. 18, 2002

(65) Prior Publication Data

US 2002/0093421 A1 Jul. 18, 2002

Related U.S. Application Data

(63) Continuation of application No. 09/301,781, filed on Apr. 29, 1999, now Pat. No. 6,388,567.

(51) Int. Cl.$^7$ ............................................... B60C 23/00
(52) U.S. Cl. .................... 340/442; 73/146; 73/146.5; 152/152.1; 152/123; 340/445; 340/447
(58) Field of Search ........................ 73/146, 146.5; 152/152.1; 156/123; 340/539.1, 442–448

(56) References Cited

U.S. PATENT DOCUMENTS

| | | | | |
|---|---|---|---|---|
| 5,749,984 A | * | 5/1998 | Frey et al. ................ | 152/415 |
| 5,971,046 A | * | 10/1999 | Koch et al. ............... | 152/152.1 |
| 6,030,478 A | * | 2/2000 | Koch et al. ................ | 156/123 |
| 6,192,746 B1 | * | 2/2001 | Wilson ........................ | 73/146 |
| 6,208,244 B1 | * | 3/2001 | Wilson et al. .............. | 340/447 |
| 6,244,104 B1 | * | 6/2001 | Koch et al. .................. | 73/146 |
| 6,255,949 B1 | * | 7/2001 | Nicholson et al. .......... | 340/447 |
| 6,371,178 B1 | * | 4/2002 | Wilson ..................... | 152/152.1 |
| 6,386,251 B1 | * | 5/2002 | Koch et al. .............. | 152/152.1 |
| 6,388,567 B1 | * | 5/2002 | Bohm et al. ................ | 340/442 |

* cited by examiner

Primary Examiner—Daryl Pope
(74) Attorney, Agent, or Firm—Fred H. Zollinger; Michael R. Huber

(57) ABSTRACT

A monitoring device and patch combination used to monitor the conditions of a pneumatic tire having an innerliner includes a monitoring device and patch. The monitoring device includes a first connection element that is connected to the monitoring device. The patch includes an antenna that is connected to a second connection element. In one embodiment of the invention, the first connection element is in the form of a socket while the second connection element is in the form of a plug. The connection elements allow the monitoring device and patch to be separately fabricated and the direct physical connection between the antenna and the monitoring device to be formed when the combination is connected to the innerliner of the tire. In another embodiment, a plug extends from the bottom of an encapsulated monitoring device and is aligned with a socket on the patch. The connection between the plug and the socket occurs automatically when the encapsulated monitoring device is aligned with and connected to the patch.

15 Claims, 6 Drawing Sheets

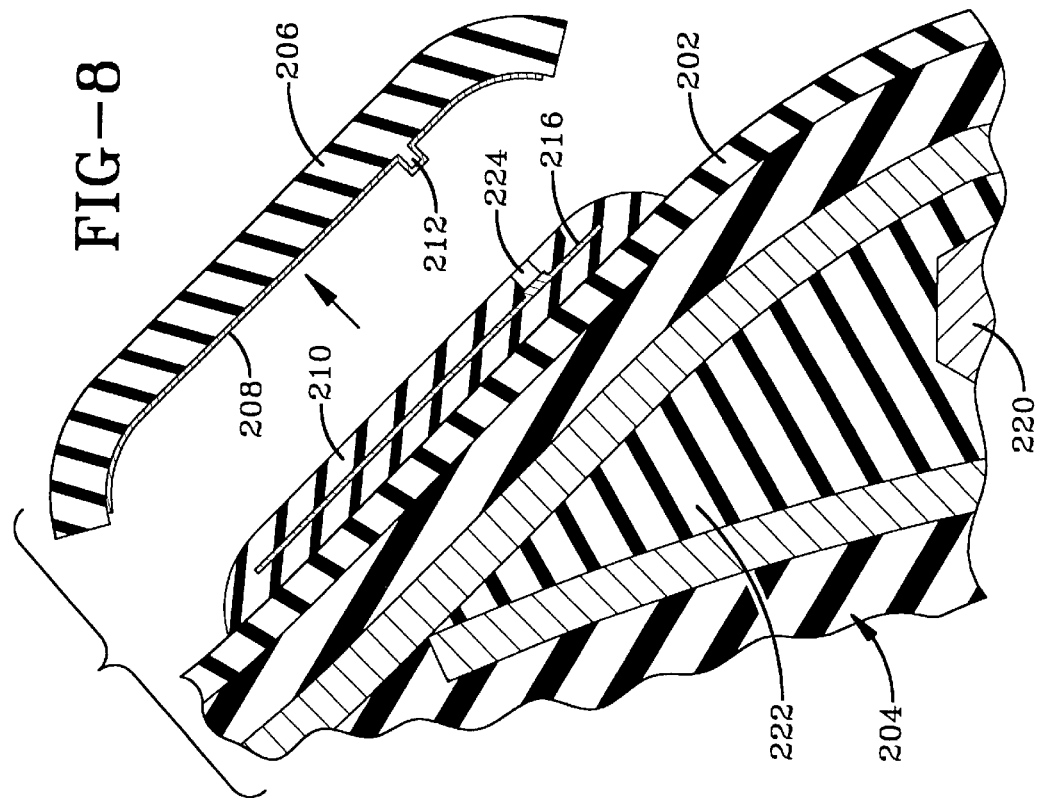
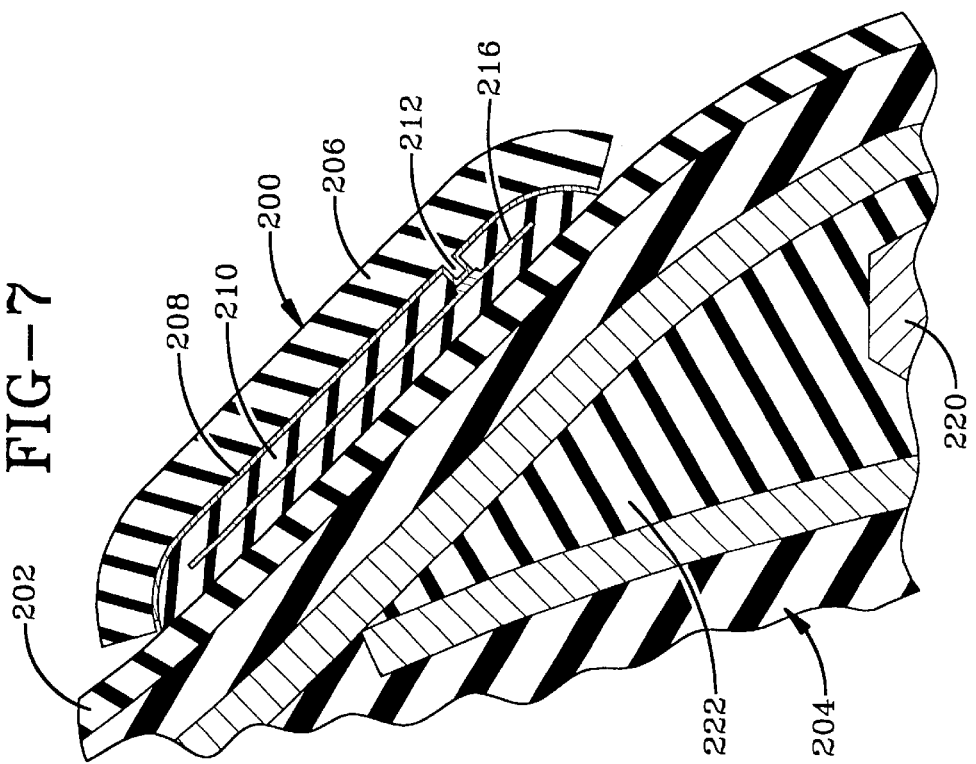

PATCH AND TIRE MONITORING DEVICE

CROSS REFERENCE TO RELATED APPLICATION

This application is a continuation application claiming priority from U.S. patent application Ser. No. 09/301,781, filed Apr. 29, 1999; now U.S. Pat. No. 6,388,567, the disclosures of which are incorporated herein by reference.

BACKGROUND OF THE INVENTION

1. Technical Field

The present invention generally relates to monitoring devices used to monitor at least one engineering condition of a pneumatic tire and, more particularly, to a monitoring device and patch combination where the antenna of the monitoring device is disposed in the patch. Specifically, the present invention relates to an encapsulated monitoring device and a patch for attaching the encapsulated monitoring device to the innerliner of a pneumatic tire with the antenna of the monitoring device being disposed in the patch and including a connector that allows the user to selectively connect the antenna to the monitoring device.

2. Background Information

It is often desired in the art to monitor an engineering condition of a tire while the tire is installed and in use on a vehicle. Typical desirable measurements are the number of tire rotations, the internal temperature of the tire, and the internal pressure of the tire. These measurements are preferably taken while the tire is in use on the vehicle without having to remove the tire from the vehicle or specifically position the tire to take the measurement.

Numerous types of monitoring devices are known in the art to perform these measurements. One type of monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the information gathered by the monitoring device to an information gathering device positioned outside of the tire. One of the problems in the art is to position the antenna such that the information gathered by the monitoring device is accurately transmitted to the information gathering device outside of the tire. It is desired to position the antenna against the sidewall of the pneumatic tire so that the transmission waves pass directly into the sidewall. In the past, the antenna of the monitoring device generally extended into the interior chamber of the tire such that the transmission waves had to pass first through the air inside the tire, through the innerliner, through the tire sidewall, and then through the air to the information gathering device. It is desired in the art to provide an antenna for an active, self-powered programmable electronic device that is positioned so that the transmission waves do not have to first pass through the inner chamber of the tire before entering the tire sidewall.

The bead ring and apex filler of the tire tend to interfere with the transmission from the monitoring device. It is thus desired in the art to position the antenna away from the bead ring and apex filler so that the transmission through the tire sidewall is as strong as possible. On the other hand, it is also desirable to position the monitoring device as close to the bead ring as possible because that area of the tire sidewall is a low flex area that stretches less than the middle portion of the tire sidewall. It is thus desired in the art to provide a method for attaching an antenna and a monitoring device that accommodates the desired position for both elements.

The monitoring devices known in the art are typically encapsulated with an encapsulation material that provides structural support to the monitoring device so that the device is not destroyed by the forces normally encountered and experienced by a pneumatic tire. In some situations, the process of encapsulation must take into account that the antenna must extend from the encapsulated monitoring device. It is desired to provide a monitoring device configuration that eliminates this encapsulation problem by positioning the antenna apart from the monitoring device.

One method of connecting the monitoring device to the innerliner of a tire includes the use of a rubber attachment patch to carry the monitoring device with the inner surface of the rubber attachment patch being configured to securely adhere to the innerliner of a tire. It is desired that the sensitive electronic monitoring device and the rubber patch be capable of being manufactured in separate locations and assembled when the monitoring device is attached to the innerliner of a tire. Separating the rubber attachment patch and the sensitive monitoring device also allows the rubber attachment patch to be aggressively attached to the innerliner of a tire without the risk of damaging the sensitive monitoring device. After the rubber attachment patch is securely anchored to the innerliner, the monitoring device may be attached to the patch.

SUMMARY OF THE INVENTION

In view of the foregoing, it is an objective of the present invention to provide a monitoring device and patch combination that may be fabricated at separate manufacturing facilities and then connected together when the monitoring device is installed in a pneumatic tire.

Another objective of the present invention is to provide a monitoring device and patch combination wherein the antenna for the monitoring device is carried by the patch.

A further objective of the present invention is to provide a monitoring device and patch combination that positions the antenna in a manner that causes the transmission waves to pass directly into the tire sidewall away from the bead ring and apex filler of the tire.

Another objective of the present invention is to provide a monitoring device and patch combination that allows the antenna to be ideally positioned away from the bead ring while allowing the monitoring device to be positioned closer to the bead ring.

Another objective of the present invention is to provide a monitoring device and patch combination that has a connector that allows the user to form the connection between the antenna and the monitoring device after the individual elements have been fabricated.

A further objective of the present invention is to provide a monitoring device and patch combination that automatically forms the connection between the antenna and the monitoring device when the monitoring device is aligned and connected with the patch.

Another objective of the present invention is to provide a method for installing a monitoring device on the innerliner of a tire that allows the patch of the combination to be connected prior to the monitoring device and aggressively stitched to the innerliner without the danger of damaging the monitoring device.

Another objective of the present invention is to provide a monitoring device and patch combination that automatically forms the connection between an antenna embedded within an anchoring patch adhered to the innerliner of a tire when the monitoring device and patch combination is adhered to the anchoring patch.

Another objective of the present invention is to provide a method and combination that are of simple construction, that achieve the stated objectives in a simple, effective, and inexpensive manner, that solve the problems, and that satisfy the needs existing in the art.

These and other objectives and advantages of the present invention are obtained by a monitoring device and patch combination used to monitor the conditions of a pneumatic tire having an innerliner, the combination including a monitoring device; a patch selectively carrying the monitoring device, the patch adapted to mount the monitoring device on the innerliner of the pneumatic tire; an antenna carried by the patch; and a connector selectively physically electrically connecting the antenna to the monitoring device.

Other objectives and advantages of the invention are obtained by a method of installing a monitoring device on the innerliner of a tire including the steps of providing a monitoring device having a first connection element; providing a patch separate from the monitoring device, the patch having an antenna connected to a second connection element; attaching the monitoring device to the patch; and connecting the first and second connection elements to create a connection between the antenna and the monitoring device; and mounting the patch on the innerliner.

BRIEF DESCRIPTION OF THE DRAWINGS

The preferred embodiments of the invention, illustrative of the best mode in which the applicants contemplate applying the principles of the invention, are set forth in the following description and are shown in the drawings and are particularly and distinctly pointed out and set forth in the appended claims.

FIG. 7 is a partial sectional view of a pneumatic tire with an anchoring patch having an antenna secured to the innerliner of the tire;

FIG. 8 is a view similar to FIG. 7 with a portion of the anchoring patch being removed to provide an alignment hole that provides access to the antenna;

Similar numerals refer to similar parts throughout the drawings.

DESCRIPTION OF THE PREFERRED EMBODIMENTS

Figure 2:
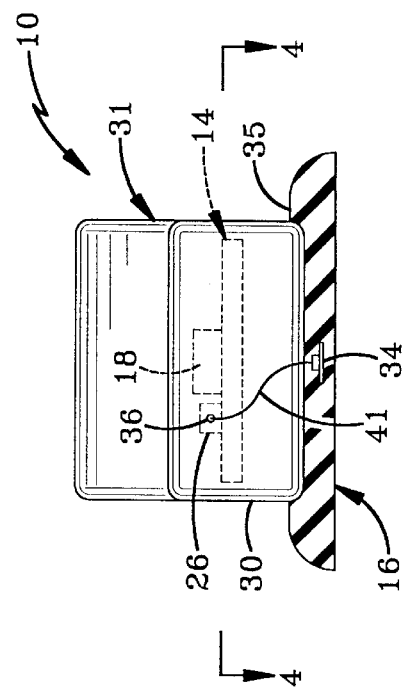
FIG. 2 is a sectional side view of a first embodiment of the monitoring device and patch combination of the present invention.
Figure 3:
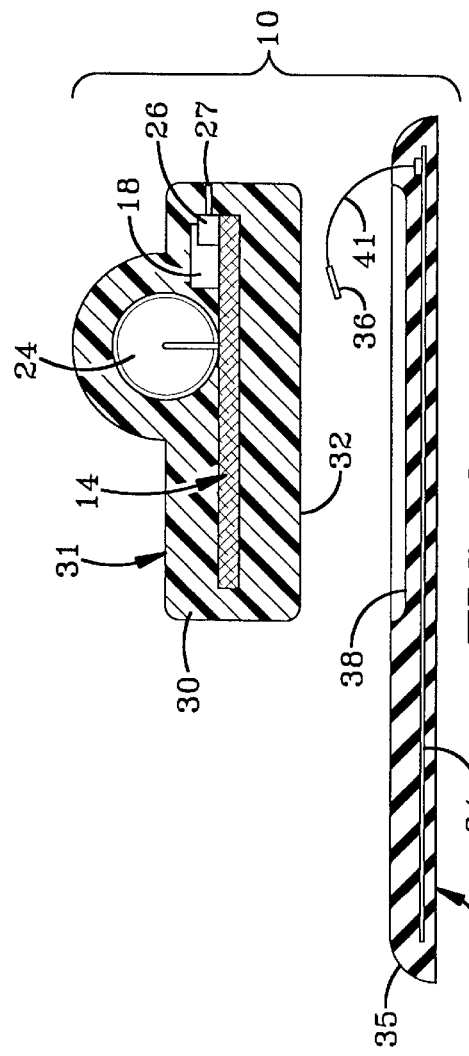
FIG. 3 is a sectional end view of the monitoring device and patch combination showing the arrangement of the foot portion of the patch with respect to the encapsulated monitoring device.

The first embodiment of the monitoring device and patch combination of the present invention is depicted in FIGS. 1–4 and is indicated generally by the numeral 10. Combination 10 is connected to an innerliner 12 of a pneumatic tire 8 in FIG. 1. Combination 10 preferably is connected to innerliner 12 by an attachment or connector that is known in the art, such as a suitable adhesive.

Combination 10 includes a monitoring device 14 and a patch 16 that are fabricated separately. Monitoring device 14 includes at least one sensing element 18 and may include a plurality of sensing elements that gather information about at least one engineering condition of pneumatic tire 8. Monitoring device 14 further includes a power source such as a battery 24 that powers monitoring device 14. Examples of monitoring devices are shown in U.S. Pat. Nos. 5,573,610 and 5,500,065, the contents of which are incorporated herein by reference.

Monitoring device 14 is connected to a first connection element 26 that is in the form of a socket in the first embodiment of the present invention. Monitoring device 14 and first connection element or socket 26 are preferably encapsulated by an encapsulation material 30 that serves to protect monitoring device 14 and forms an encapsulated monitoring device 31. Encapsulation material 30 may be a suitable epoxy or plastic that provides a rigid structure around monitoring device 14 and socket 26. An opening 27 (FIG. 4) through encapsulation material 30 provides access to socket 26 from the outside of the encapsulated monitoring device 31. Encapsulated monitoring device 31 includes a bottom surface 32 that provides a mounting surface for device 31.

Figure 1:
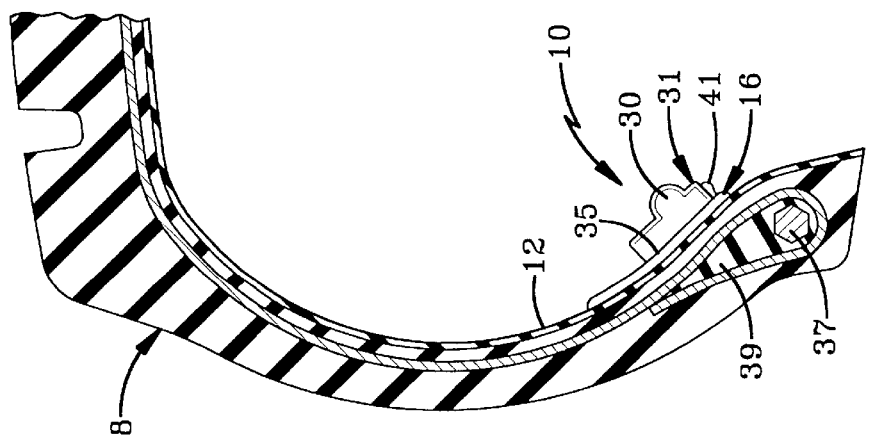
FIG. 1 is a partial sectional view of a pneumatic tire with the monitoring device and patch combination connected to the innerliner of the pneumatic tire.
Figure 4:
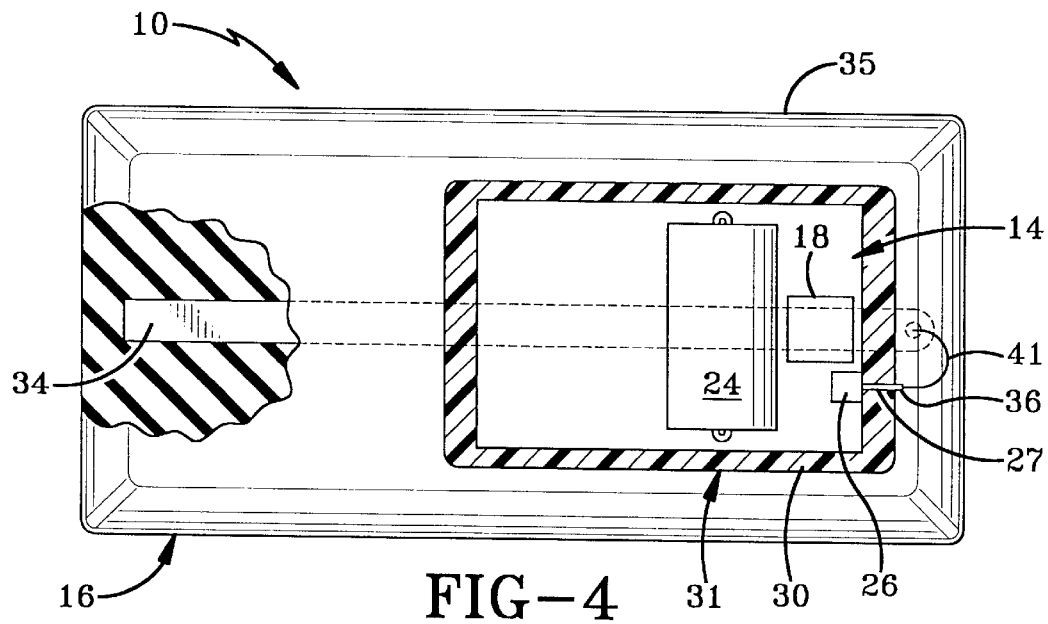
FIG. 4 is a sectional view taken along line 4—4, FIG. 3.

Patch 16 (FIG. 2) includes an antenna 34 embedded within the body of the patch. Antenna 34 may be any of a variety of shapes including a wire, plate, rod, etc. A second connection element 36 is connected to antenna 34. In the first embodiment of the present invention, second connection element 36 is in the form of a plug that is connected to antenna 34 by a flexible wire 41. Patch 16 may be formed from a suitable rubber that is compatible with and provides desirable adhesion properties with respect to innerliner 12. Patch 16 has a recessed top surface 38 sized and adapted to receive encapsulated monitoring device 31 such that bottom surface 32 lies against top surface 38 when device 31 is connected to patch 16. Patch 16 also includes a foot portion 35 (FIG. 4) that extends away from top portion 38 where encapsulated monitoring device 31 is seated. Antenna 34 is disposed within foot portion 35 so that it may extend away from monitoring device 14. This relative location allows antenna 34 to be positioned away from the bead ring 37 and apex filler 39 of tire 8 when combination 10 is attached to innerliner 12 (FIG. 1). The space between antenna 34 and monitoring device 14 allows combination 10 to be ideally positioned on innerliner 12 with monitoring device 14 positioned close to bead ring 37 and antenna 34 positioned away from bead ring 37.

In accordance with one of the objectives of the present invention, socket 26 is configured and adapted to receive plug 36 to form a direct physical electrical connection between antenna 34 and monitoring device 14. The connection between antenna 34 and monitoring device 14 may thus be selectively created by selectively placing plug 36 into socket 26. A direct physical electrical connection between antenna 34 and monitoring device 14 is achieved when plug 36 is received in socket 26.

Monitoring device 14 and pad 16 may be connected to innerliner 12 in the following manner. First, monitoring device 14 is provided with socket 26. Monitoring device 14 is then encapsulated with encapsulation material 30 to entirely encapsulate monitoring device 14 and to partially encapsulate socket 26. Patch 16 is then fabricated with antenna 34 embedded within foot portion 35. Antenna 34 is connected to plug 36 by a flexible wire 41 that extends outside of patch 16. The steps of fabricating encapsulated monitoring device 31 and patch 16 may be performed at separate manufacturing locations because no physical connection between antenna 34 and monitoring device 14 is required during the fabrication steps.

An area of innerliner 12 of pneumatic tire 8 is then selected where combination 10 is to be installed. It is desirable to install combination 10 such that monitoring device 14 is adjacent bead ring 37 while foot portion 35 of patch 16 having antenna 34 extends away from bead ring 37. Patch 16 may be connected to innerliner 12 by a suitable adhesive or by other attachment methods known in the art. One attachment example would be a thermoplastic or thermoset adhesive that may require some heat to properly function. Patch 16 may be aggressively stitched to innerliner 12 without the danger of damaging monitoring device 14 because monitoring device 14 may be attached to patch 16 after patch 16 is connected to innerliner 12.

Encapsulated monitoring device 31 then may be connected to patch 16 by seating bottom surface 32 of encapsulated monitoring device 31 onto top surface 38 of patch 16. A suitable manner of connecting the two elements is used such as a suitable adhesive. The direct physical electrical connection between antenna 34 and monitoring device 14 is then created by connecting plug 36 with socket 26. This connection creates a direct electrical connection between antenna 34 and monitoring device 14.

In another installation method, encapsulated monitoring device 31 is first mounted on patch 16 and secured thereto with a suitable adhesive. The direct electrical connection is made between antenna 34 and monitoring device 14 before patch 16 is mounted on innerliner 12. Patch 16 carrying encapsulated monitoring device 31 is then mounted on innerliner 12 with a suitable adhesive.

Figure 5:
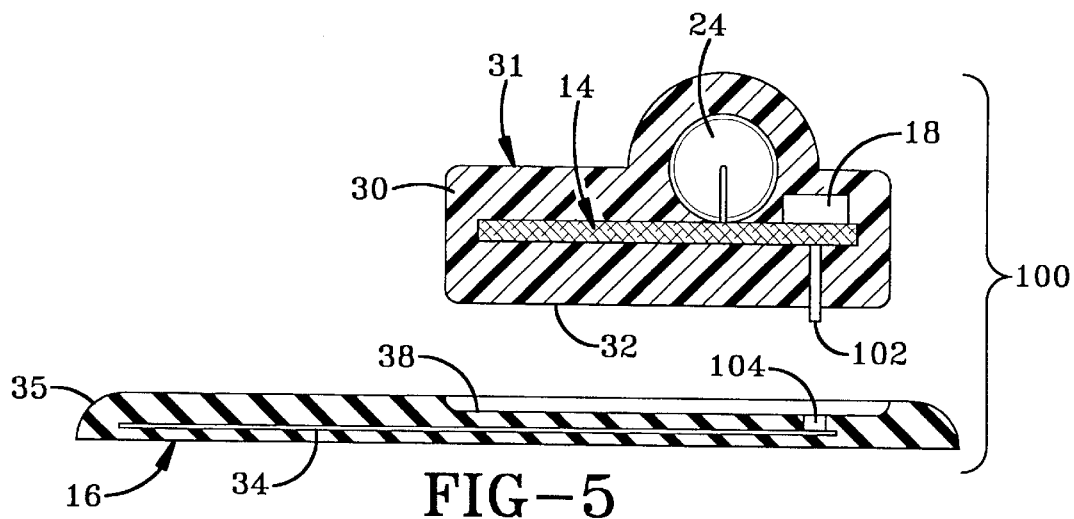
FIG. 5 is a sectional side view of a second embodiment of the monitoring device and patch combination of the present invention.
Figure 6:
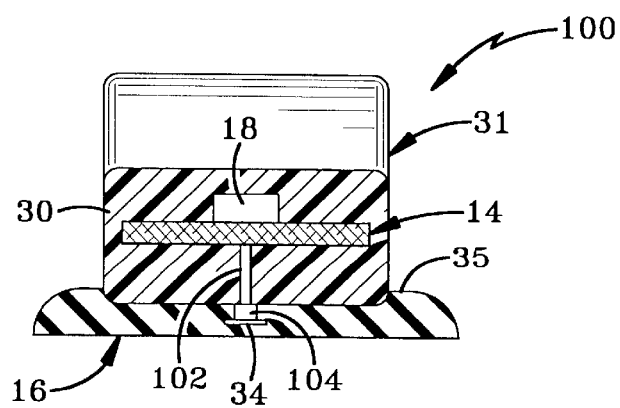
FIG. 6 is a sectional end view of the second embodiment of the monitoring device and patch combination.

A second embodiment of the invention is depicted in FIGS. 5 and 6 and is indicated generally by the numeral 100. Combination 100 includes many of the same elements and configurations as combination 10 discussed above and thus similar numerals are used to identify similar parts between the two embodiments. Second embodiment of combination 100 also includes monitoring device 14 that is encapsulated with encapsulation material 30 to form encapsulated monitoring device 31. The first connection element 102 of combination 100 is in the form of a plug that is connected to monitoring device 14 and extends out from encapsulated monitoring device 31. Plug 102 extends substantially rigidly away from bottom surface 32 of encapsulated monitoring device 31. The second connection element of combination 100 is in the form of a socket 104 disposed on top surface 38 of patch 16. Socket 104 is aligned with plug 102 such that plug 102 docks with socket 104 when encapsulated monitoring device 31 is seated on patch 16 as shown in FIG. 6. The alignment of plug 102 and socket 104 allows the direct physical electrical connection between antenna 34 and monitoring device 14 to be automatically made when encapsulated monitoring device 31 is aligned and seated on patch 16.

Combination 100 may be installed on pneumatic tire 8 in the following manner. First, patch 16 is connected to innerliner 12 by suitable adhesive or by other suitable methods known in the art. Patch 16 may be aggressively stitched to innerliner 12 without the danger of damaging monitoring device 14 because monitoring device 14 is not yet attached to patch 16. Once patch 16 is securely attached to innerliner 12, encapsulated monitoring device 31 is aligned with patch 12 such that plug 102 is aligned with socket 104. Encapsulated monitoring device 31 is then seated on top surface 38 of patch 16 and secured thereto by a suitable adhesive. When this occurs, plug 102 docks with socket 104 and automatically provides the direct physical electrical connection between antenna 34 and monitoring device 14.

Combination 100 may also be installed by first mounting patch 16 on innerliner 12. Encapsulated monitoring device 31 is then mounted on patch 16 to automatically form the direct electrical connection when plug 102 is received in socket 104.

Figure 9:
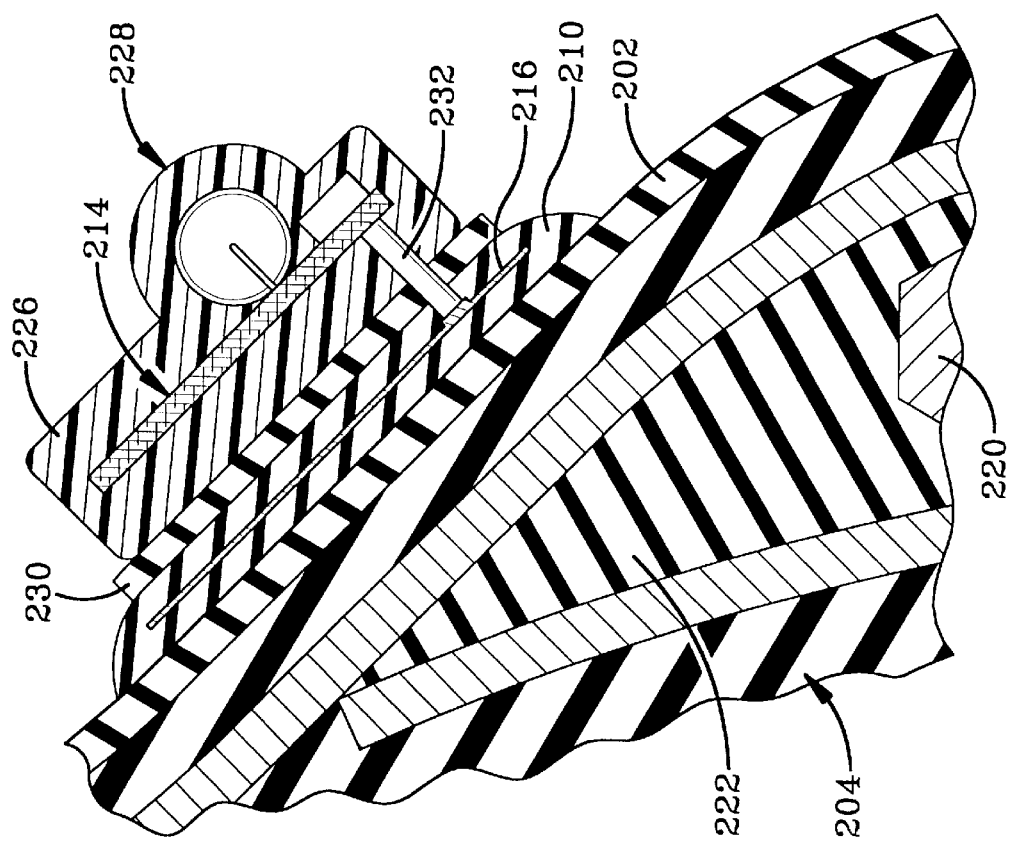
FIG. 9 is a sectional view similar to FIGS. 7 and 8 showing the attachment of an encapsulated monitoring device and patch combination to the anchoring patch whereby a physical electrical connection is provided between the antenna and an electronic monitoring device disposed within the encapsulated monitoring device.

Another embodiment of the present invention is described with reference to FIGS. 7–9. In this embodiment, an anchoring patch 200 is adhered to the innerliner 202 of a pneumatic tire 204. Anchoring patch 200 may be adhered to innerliner 202 during the curing process of a green tire or may be otherwise adhered to innerliner 202 by a suitable adhesive. Anchoring patch 200 includes a protective cover 206 preferably formed from a cured rubber. Cover 206 may be reinforced with a plurality of cords. A layer of cure material 208, such as cure paper or cure cloth, is disposed adjacent cover 206 and prevents cover 206 and an anchoring layer 210 from curing together. Anchoring layer 210 may be initially formed of an uncured rubber that is initially stitched to innerliner 202 and then cured to innerliner 202 during the curing process of the green tire. Anchoring layer 210 may also be a layer of cured rubber that is adhered to innerliner 202 by a suitable adhesive. A description of at least one type of anchoring patch 200 and a method for using the patch are described in U.S. patent applications Ser. Nos. 09/206,273 and 09/205,931, filed Dec. 4, 1998.

In accordance with the objectives of the present invention, cover 206 includes a plug 212 that extends through cure material 208 and into the body of anchoring layer 210. Additional plugs 212 may be provided depending on the desired number of connections between an electronic monitoring device 214 and an antenna 216. Each plug 212 is fabricated from a material or coated with a material that will not adhere to anchoring layer 210 to a degree where plug 212 cannot be removed. In accordance with another objective of the invention, antenna 216 is embedded within anchoring layer 210 and may be any suitable antenna such as an elongated plate or a wire fabricated from a conductive material. The position of antenna 216 allows monitoring device 214 to be fabricated separately from anchoring patch 200.

In this embodiment of the present invention, anchoring patch 200 is located on innerliner 202 to ideally position antenna 216 away from bead ring 220 and apex filler 222. This location allows antenna 216 to extend away from bead ring 220 and apex filler 222 so that the communication between antenna 216 and a data gathering device (not shown) that is positioned outside tire 204 is not interfered with.

When electronic monitoring device 214 is mounted on tire 204, cover 206 and cure material 208 are removed from anchoring layer 210 as shown in FIG. 8. The removal of cover 208 also removes plug 212 which leaves an alignment hole 224 in anchoring layer 210 that extends to antenna 216. Alignment hole 224 allows electronic monitoring device 214 to be located with respect to antenna 216.

Electronic monitoring device 214 is typically encapsulated with an encapsulation material 226 to form an encapsulated monitoring device 228. Encapsulated monitoring device 228 is connected to an attachment patch 230 by an appropriate adhesive. As shown in FIG. 9, a connector such as a prong 232 extends from electronic monitoring device 214, through encapsulation material 226, through attachment patch 230, and extends beyond attachment patch 230 a distance sufficient to fill alignment hole 224 and contact antenna 216 when attachment patch 230 and encapsulated monitoring device 228 are connected to anchoring layer 210. When attachment patch 230 and encapsulated monitoring device 228 are attached to anchoring layer 210, prong 232 contacts antenna 216 to provide a direct physical electrical connection between electronic monitoring device 214 and antenna 216. The attachment between attachment patch 230 and anchoring layer 210 may be by an adhesive or by curing attachment patch 230 to anchoring layer 210 by heat or a chemical curing process.

In other embodiments of the invention, attachment patch 230 is adhered to anchoring layer 210 before encapsulated monitoring device 228 is attached to attachment patch 230. In still other embodiments, alignment hole 224 is not formed and connector 232 simply pierces attachment patch 230 and anchoring layer 210 to form the direct physical electrical connection between antenna 216 and monitoring device 214. Connector 232 may also extend out of anchoring layer 210 to be received by monitoring device 214 as explained above with respect to FIGS. 1–3.

Figure 10:
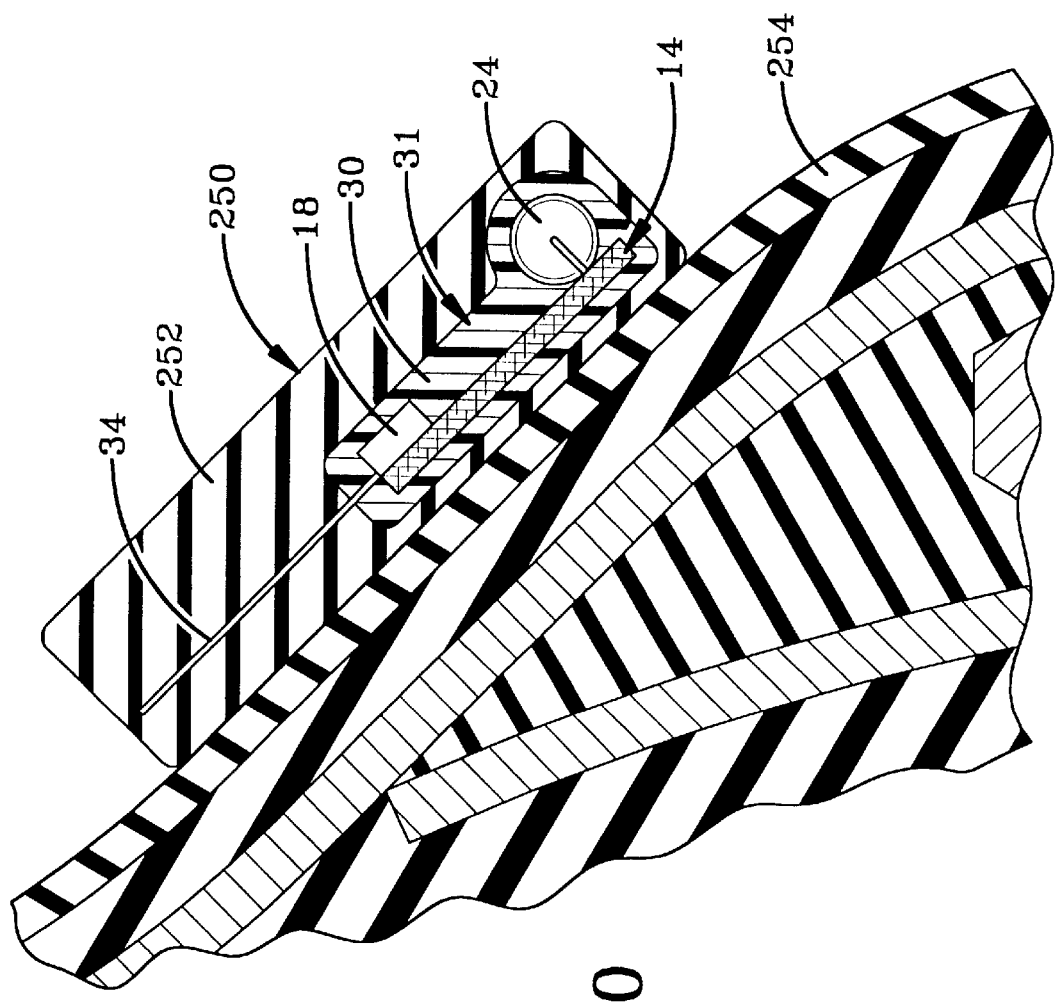
FIG. 10 is a sectional view of a monitoring device and antenna embedded within a patch connected directly to the innerliner.

Another embodiment of the invention is depicted in FIG. 10 and is indicated generally by the numeral 250. In this embodiment, encapsulated monitoring device 31 and antenna 34 are embedded within an attachment patch 252. Attachment patch 252 is then connected to the innerliner 254 of the pneumatic tire by an appropriate connector such as an adhesive. The location of antenna 34 within patch 252 improves the transmission wave propagation from antenna 34 through the sidewall of the pneumatic tire. The location of antenna 34 and encapsulated monitoring device 31 also prevents antenna 34 or encapsulated monitoring device 31 from being damaged because they cannot move inside of the pneumatic tire.

Figure 11:
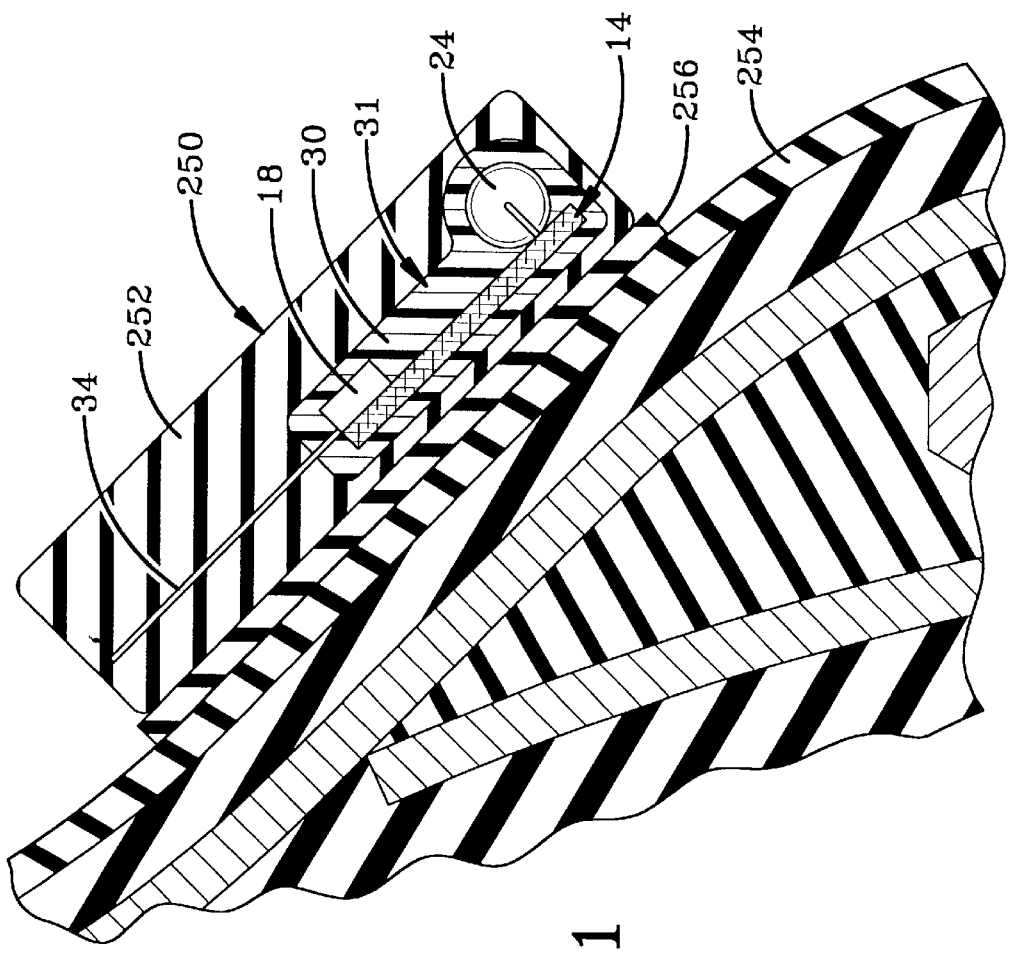
FIG. 11 is a view similar to FIG. 10 with the patch connected to the innerliner with an anchoring layer of an anchoring patch.

An alternative method of mounting monitoring device and antenna combination 250 to innerliner 254 is depicted in FIG. 11. In this embodiment, an anchoring layer 256 substantially similar to anchoring layer 210 described above is used to mount patch 252 to innerliner 254.

Accordingly, the improved monitoring device and patch combination is simplified, provides an effective, safe, inexpensive, and efficient device that achieves all the enumerated objectives of the invention, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the monitoring device and patch combination is constructed and used, the characteristics of the construction, and the advantageous new and useful results obtained, the new and useful structures, devices, elements, arrangements, parts, combinations, and methods are set forth in the appended claims.

What is claimed is:

1. A pneumatic tire and monitoring device assembly; the pneumatic tire having an innerliner and the monitoring device adapted to monitoring at least one engineering condition of the pneumatic tire; the assembly comprising:

an antenna connected to the innerliner;

the monitoring device mounted on the innerliner; and the antenna electrically connected to the monitoring device.

2. The assembly of claim 1, wherein the antenna is embedded within the innerliner.

3. The assembly of claim 1, further comprising a patch connected to the innerliner, the monitoring device mounted on the patch.

4. A pneumatic tire and monitoring device assembly; the pneumatic tire having an innerliner and the monitoring device adapted to monitoring at least one engineering condition of the pneumatic tire; the assembly comprising:

a pneumatic tire having an innerliner;

a patch connected to the innerliner;

a monitoring device connected to the patch;

an antenna carried by on of the patch and the pneumatic tire; and connector means for selectively electrically connecting the antenna to the monitoring device.

5. The assembly of claim 4, wherein the connector means includes at least one plug and at least one socket.

6. The assembly of claim 5, wherein at least a portion of the antenna is embedded within the patch.

7. The assembly of claim 5, wherein the monitoring device is encapsulated by an encapsulation material to form an encapsulated monitoring device; the encapsulated monitoring device having a bottom surface.

8. The assembly of claim 7, wherein the plug extends out from the encapsulated monitoring device; the socket being carried by the patch and aligned with the plug whereby the plug docks with the socket when the monitoring device is aligned with and mounted on the patch.

9. The assembly of claim 5, wherein the plug substantially rigidly extends out from the bottom surface of the encapsulated monitoring device.

10. The assembly of claim 5, wherein the plug flexibly extends from the patch.

11. The assembly of claim 10, further comprising a flexible wire connecting the antenna to the plug.

12. The assembly of claim 4, wherein the patch includes a foot portion that extends away from the monitoring device, at least a portion of the antenna being carried by the foot portion of the patch.

13. A monitoring device assembly adapted to monitor an engineering condition of a pneumatic tire; the monitoring device assembly comprising:

an encapsulated monitoring device;

an antenna connected to the encapsulated monitoring device; and a patch; the encapsulated monitoring device and antenna being embedded within the patch.

14. The assembly of claim 13, wherein the antenna extends from the encapsulated monitoring device.

15. The assembly of claim 13, wherein the patch is fabricated from a rubber.

* * * * *